(12) United States Patent
Beverage et al.

(10) Patent No.: US 10,141,585 B2
(45) Date of Patent: Nov. 27, 2018

(54) MULTI-COMPONENT BIPOLAR PLATE FOR AN ELECTROCHEMICAL CELL

(71) Applicant: Nuvera Fuel Cells, LLC, Billerica, MA (US)

(72) Inventors: Kevin Beverage, Leominster, MA (US); Ed Domit, Westford, MA (US); Roger Van Boeyen, Westford, MA (US)

(73) Assignee: Nuvera Fuels Cells, LLC, Billerica, MA (US)

( * ) Notice: Subject to any disclaimer, the term of this patent is extended or adjusted under 35 U.S.C. 154(b) by 157 days.

(21) Appl. No.: 15/232,851

(22) Filed: Aug. 10, 2016

(65) Prior Publication Data

US 2017/0047596 A1 Feb. 16, 2017

Related U.S. Application Data

(60) Provisional application No. 62/203,414, filed on Aug. 11, 2015.

(51) Int. Cl.

| *H01M 8/0276* | (2016.01) |
| *H01M 8/0282* | (2016.01) |
| *H01M 8/0284* | (2016.01) |
| *C25B 9/04* | (2006.01) |
| *C25B 13/04* | (2006.01) |

(Continued)

(52) U.S. Cl.
CPC .............. *H01M 8/0276* (2013.01); *C25B 9/04* (2013.01); *C25B 13/04* (2013.01); *H01M 8/0254* (2013.01); *H01M 8/0273* (2013.01); *H01M 8/0282* (2013.01); *H01M 8/0284* (2013.01); *H01M 8/0286* (2013.01)

(58) Field of Classification Search
CPC ............. H01M 8/0276; H01M 8/0282; H01M 8/0284; C25B 9/04; C25B 13/04
See application file for complete search history.

(56) References Cited

U.S. PATENT DOCUMENTS

| 4,721,555 A | 1/1988 | Grosshandler |
| 2007/0042251 A1* | 2/2007 | Friedman ............ H01M 8/0228 429/508 |
| 2014/0238845 A1* | 8/2014 | Domit ...................... C25B 1/12 204/228.4 |

OTHER PUBLICATIONS

PCT Notification of Transmittal of the International Search Report and the Written Opinion of the International Searching Authority, or the Declaration issued in International Application No. PCT/US2016/046239, dated Oct. 28, 2016.

* cited by examiner

*Primary Examiner* — Karie O'Neill Apicella
(74) *Attorney, Agent, or Firm* — Finnegan, Henderson, Farabow, Garrett & Dunner, LLP

(57) ABSTRACT

A bipolar plate assembly is provided. The bipolar plate assembly may have a first seal assembly including a first high pressure seal, a second high pressure seal, and an insert plate disposed between the first high pressure seal and the second high pressure seal. The insert plate may have a plurality of ridges formed on an upper surface and a lower surface of the insert plate configured to penetrate into the first high pressure seal and the second high pressure seal when the first high pressure seal and the second high pressure seal are pressed onto the insert plate, thereby forming the seal assembly. The bipolar plate assembly may also have a frame and a base configured to be joined to form a bipolar plate and define a high pressure zone. The seal assembly when installed in the bipolar plate may be configured to seal the high pressure zone.

20 Claims, 8 Drawing Sheets

(51) Int. Cl.
*H01M 8/0254* (2016.01)
*H01M 8/0273* (2016.01)
*H01M 8/0286* (2016.01)

MULTI-COMPONENT BIPOLAR PLATE FOR AN ELECTROCHEMICAL CELL

This application claims the benefit of U.S. Provisional Application No. 62/203,414, filed Aug. 11, 2015, which is incorporated by reference in its entirety.

The present disclosure is directed towards a multi-component bipolar plate, and more particularly, a high pressure seal assembly for a multi-component bipolar plate for an electrochemical cell.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms may electrochemically split into electrons and protons (hydrogen ions) at the anode. The electrons flow through the circuit to the cathode and generate electricity, while the protons diffuse through the electrolyte membrane to the cathode. At the cathode, hydrogen protons may react with electrons and oxygen (supplied to the cathode) to produce water and heat.

An electrolysis cell represents a fuel cell operated in reverse. A basic electrolysis cell may function as a hydrogen generator by decomposing water into hydrogen and oxygen gases when an external electric potential is applied. The basic technology of a hydrogen fuel cell or an electrolysis cell may be applied to electrochemical hydrogen manipulation, such as, electrochemical hydrogen compression, purification, or expansion.

An electrochemical hydrogen compressor (EHC), for example, may be used to selectively transfer hydrogen from one side of a cell to another. An EHC may comprise a proton exchange membrane sandwiched between a first electrode (i.e., an anode) and a second electrode (i.e., a cathode). A gas containing hydrogen may contact the first electrode and an electric potential difference may be applied between the first and second electrodes. At the first electrode, the hydrogen molecules may be oxidized and the reaction may produce two electrons and two protons. The two protons are electrochemically driven through the membrane to the second electrode of the cell, where they are rejoined by two rerouted electrons and reduced to form a hydrogen molecule. The reactions taking place at the first electrode and second electrode may be expressed as chemical equations, as shown below.

First electrode oxidation reaction: $H_2 \rightarrow 2H^+ + 2e^-$

Second electrode reduction reaction: $2H^+ + 2e^- \rightarrow H_2$

Overall electrochemical reaction: $H_2 \rightarrow H_2$

EHCs operating in this manner are sometimes referred to as a hydrogen pumps. When the hydrogen accumulated at the second electrode is restricted to a confined space, the electrochemical cell compresses the hydrogen or raises the pressure. The maximum pressure or flow rate an individual cell is capable of producing may be limited based on the cell design.

To achieve greater compression or higher pressure, multiple cells may be linked in series to form a multi-stage EHC. In a multi-stage EHC the gas flow path, for example, may be configured so the compressed output gas of the first cell may be the input gas of the second cell. Alternatively, single-stage cells may be linked in parallel to increase the throughput capacity (i.e., total gas flow rate) of an EHC. In both a single-stage and multi-stage EHC, the cells may be stacked and each cell may include a cathode, an electrolyte membrane, and an anode. Each cathode/membrane/anode assembly constitutes a "membrane electrode assembly", or "MEA", which is typically supported on both sides by bipolar plates. In addition to providing mechanical support, the bipolar plates physically separate individual cells in a stack while electrically connecting them. The bipolar plates also act as current collectors/conductors, and provide passages for process fluids. Typically, bipolar plates are made from metals, for example, stainless steel, titanium, etc., and from non-metallic electrical conductors, for example, graphite.

Recently, multi-component bipolar plates have been introduced in high pressure electrochemical cell applications, for example, hydrogen compressors. The use of multi-component bipolar plates are intended to provided numerous advantageous, for example, improved performance, reduced manufacturing cost, and improved flexibility in material selection. U.S. Provisional Patent Application 62/042,884, for example, which is incorporated herein by reference, discloses several embodiments of multi-component bipolar plate designs. Although the multi-component bipolar plates disclosed in the '884 application provide many advantages, further improvement may be achieved, particularly with regard to reduction in the manufacturing cost associated with the manufacturing of the bipolar plate components. The present disclosure is directed to providing an improved multi-component bipolar plate design, which enables more cost effective manufacturing.

One aspect of the present disclosure is directed to a bipolar plate assembly. The bipolar plate assembly may include a first seal assembly including a first high pressure seal, a second high pressure seal, and an insert plate disposed between the first high pressure seal and the second high pressure seal. The insert plate may have a plurality of ridges formed on an upper surface and a lower surface of the insert plate configured to penetrate into the first high pressure seal and the second high pressure seal when the first high pressure seal and the second high pressure seal are pressed onto the insert plate, thereby forming the seal assembly. The bipolar plate assembly may also include a frame and a base configured to be joined to form a bipolar plate and define a high pressure zone. The seal assembly when installed in the bipolar plate may be configured to seal the high pressure zone.

Another aspect of the present disclosure is directed to a method of assembling a multi-component bipolar plate. The method may include pressing a first high pressure seal onto a lower surface of an insert plate, wherein the lower surface has a first plurality of ridges configured to penetrate the first high pressure seal thereby creating a first sealing surface. The method may also include pressing a second high pressure seal onto an upper surface of the insert plate, wherein the upper surface has a second plurality of ridges configured to penetrate the second high pressure seal thereby creating a second sealing surface. Pressing the first high pressure seal onto the lower surface of the insert plate and pressing the second high pressure seal onto the upper surface of the insert plate may form a first seal assembly. The method may also include installing the seal assembly into a frame and a base of the bipolar plate, thereby sealing a high pressure zone of the bipolar plate.

Another aspect of the present disclosure is directed to an electrochemical cell. The electrochemical cell may include a pair of bipolar plates and a membrane electrode assembly located between the pair of bipolar plates. At least one of the bipolar plates may include a first seal assembly including a first high pressure seal, a second high pressure seal, and an insert plate disposed between the first high pressure seal and the second high pressure seal. The insert plate may have a plurality of ridges formed on an upper surface and a lower surface of the insert plate configured to penetrate into the first high pressure seal and the second high pressure seal when the first high pressure seal and the second high pressure seal are pressed onto the insert plate, thereby forming the seal assembly. The bipolar plate may also include a frame and a base configured to be joined to form the bipolar plate and define a high pressure zone. The seal assembly when installed in the frame and the base may be configured to seal the high pressure zone of the bipolar plate.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Figure 7A:
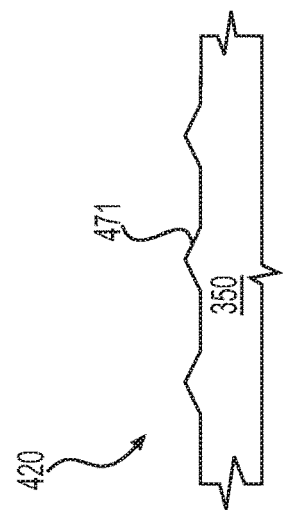
Figure 7B:
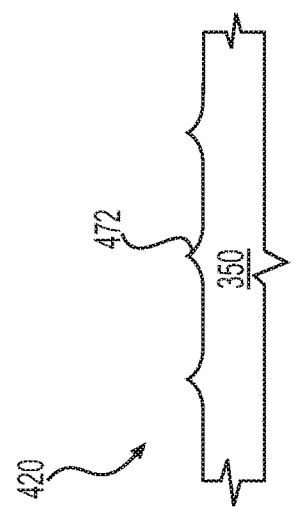
Figure 7C:
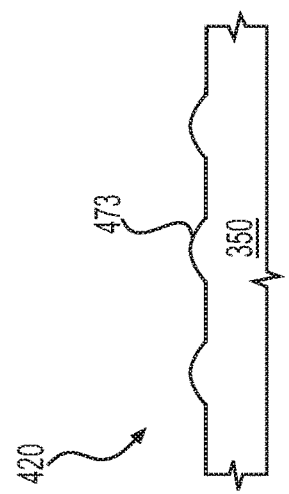

FIGS. 7A, 7B, and 7C are cross-sectional view diagrams of a portion of an insert plate, according to exemplary embodiments.

Figure 8:
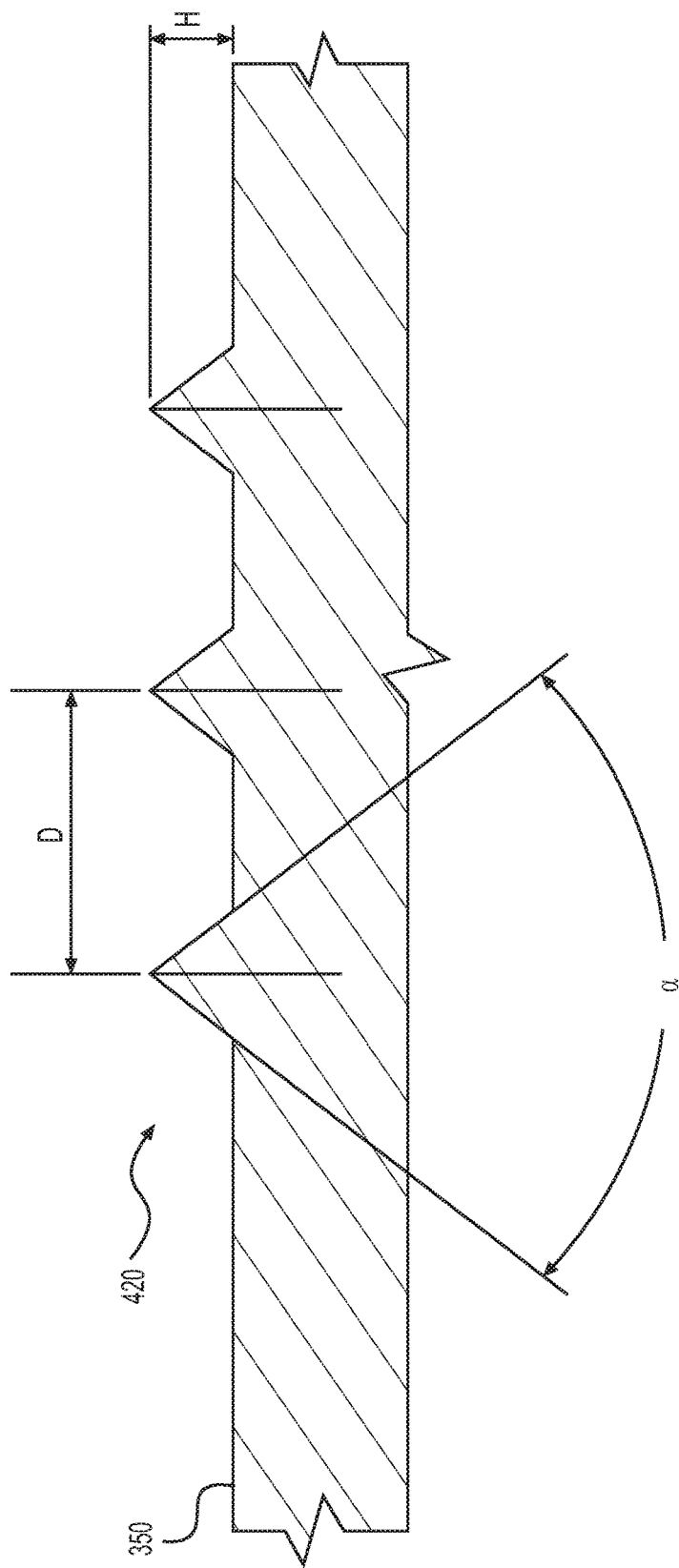

FIG. 8 is a cross-sectional view diagram of a portion of an insert plate, according to an exemplary embodiment.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell employing hydrogen, it is understood that the devices and methods of the present disclosure may be employed with various types of fuel cells and electrochemical cells, including, but not limited to electrolysis cells, hydrogen purifiers, hydrogen expanders, and hydrogen compressors.

Figure 1:
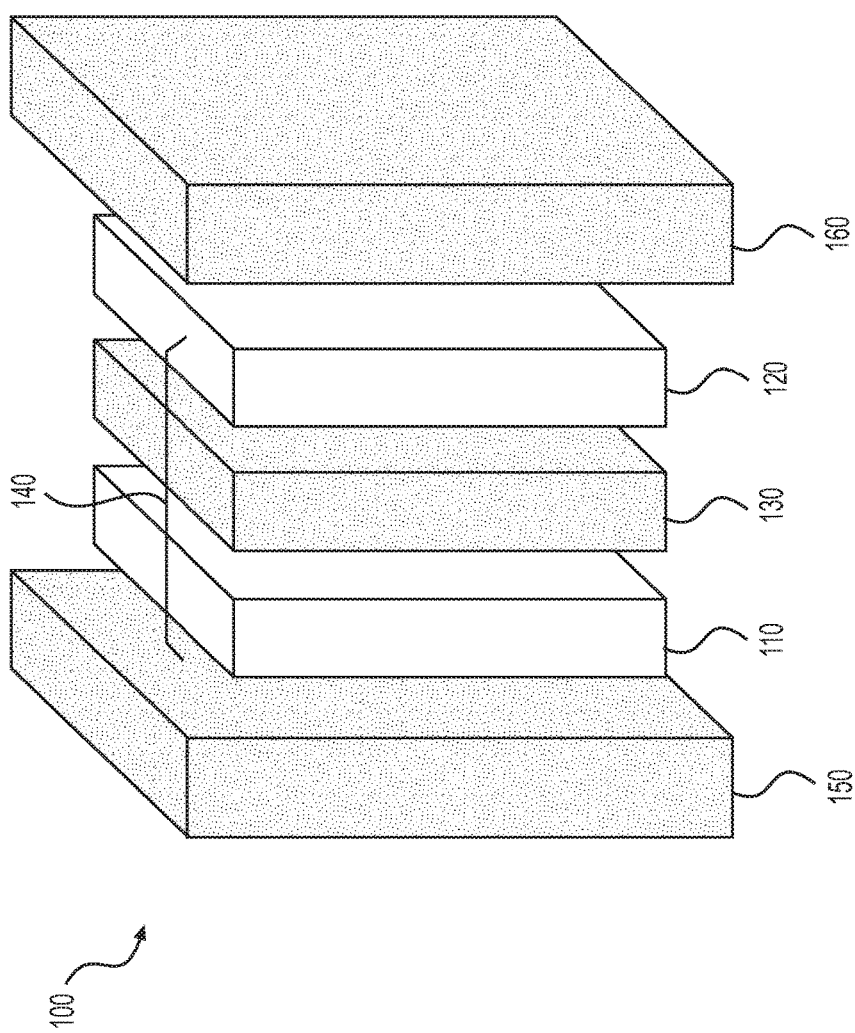
FIG. 1 is a side view illustration of part of an electrochemical cell, showing various components of an electrochemical cell.

FIG. 1 shows an exploded side view illustration of an electrochemical cell 100, according to an exemplary embodiment. Electrochemical cell 100 may comprise an anode 110, a cathode 120, and a proton exchange membrane (PEM) 130 disposed in between anode 110 and cathode 120. Anode 110, cathode 120, and PEM 130 combined may comprise a membrane electrode assembly (MEA) 140. PEM 130 may comprise a pure polymer membrane or composite membrane where other material, for example, silica, heteropolyacids, layered metal phosphates, phosphates, and zirconium phosphates may be embedded in a polymer matrix. PEM 130 may be permeable to protons while not conducting electrons. Anode 110 and cathode 120 may comprise porous carbon electrodes containing a catalyst layer. The catalyst material, for example platinum, may increase the rate of reaction.

Electrochemical cell 100 may further comprise two bipolar plates 150, 160. Bipolar plates 150, 160 may act as support plates, conductors, provide passages to the respective electrode surfaces for the fuel, and provide passages for the removal of the compressed fuel. Bipolar plates 150, 160 may also include access channels for cooling fluid (i.e., water, glycol, or water glycol mixture). Bipolar plates 150, 160 may separate electrochemical cell 100 from the neighboring cells in an electrochemical stack (not shown). In some embodiments, a bipolar plate 150, 160 can function as the bipolar plates for two neighboring cell such that each side of a bipolar plate 150, 160 is in contact with a different MEA 140. For example, multiple electrochemical cells 100 may be fluidly connected in series to form a multi-stage electrochemical hydrogen compressor (EHC) or fluidly connected in parallel to form a single-stage EHC.

In operation, according to an exemplary embodiment, hydrogen gas may be supplied to anode 110 through bipolar plate 150. An electric potential may be applied between anode 110 and cathode 120, wherein the potential at anode 110 is greater than the potential at cathode 120. The hydrogen at anode 110 may be oxidized causing the hydrogen to split into electrons and protons. The protons are electrochemically transported or "pumped" through PEM 130 while the electrons are rerouted around PEM 130. At cathode 120 on the opposite side of PEM 130 the transported protons are reduced by the rerouted electrons to form hydrogen. As more and more hydrogen is formed at cathode 120 the hydrogen may be compressed and pressurized within a confined space.

According to an exemplary embodiment, bipolar plate 150 and 160, may each be formed of at least two pieces or components. Multi-component (e.g., two-component) bipolar plates may be advantageous for various reasons. For example, reduced manufacturing cost, flexibility in manufacturing, reduced material cost, increased serviceability, and improved material selection capability (e.g., electrical conductivity and corrosion resistance).

Figure 2:
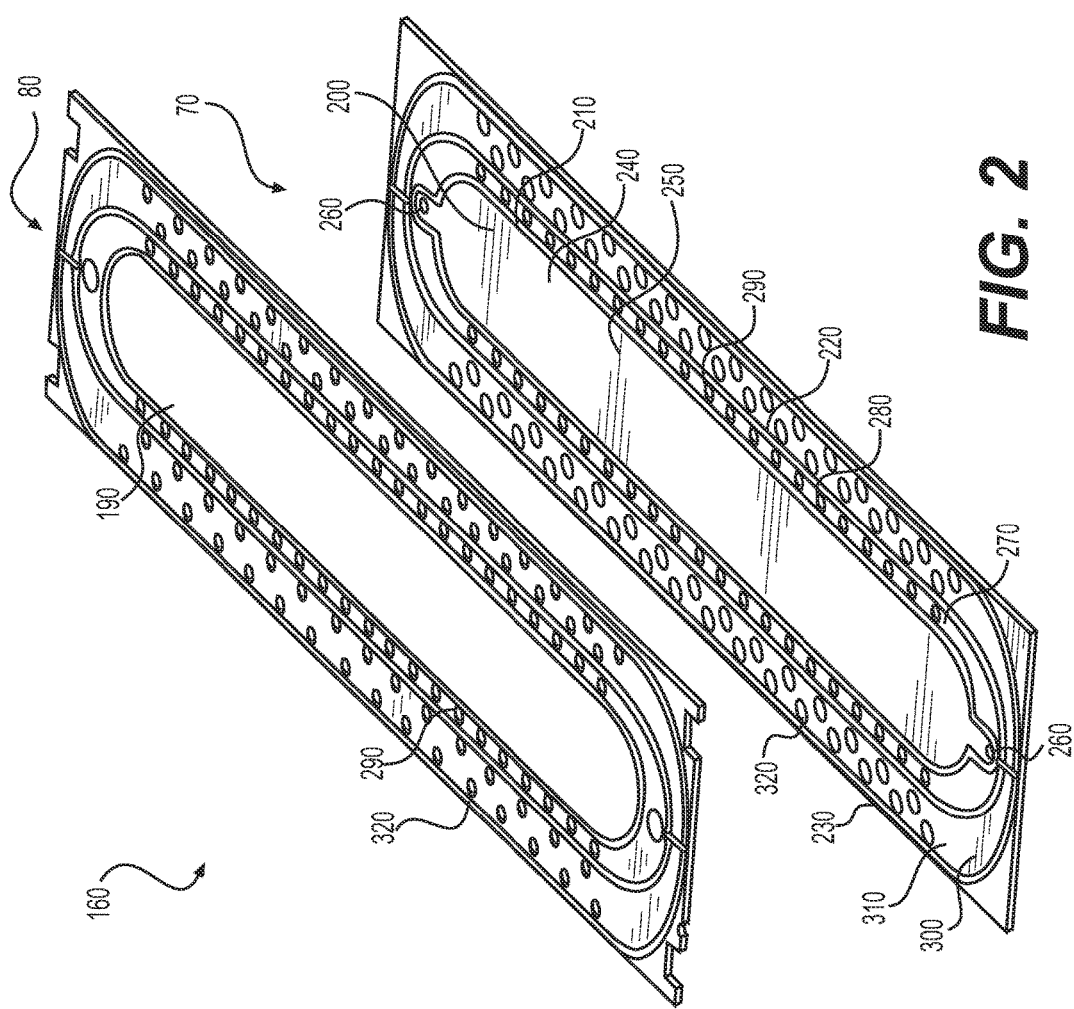
FIG. 2 is a prospective view of a base and a frame of a bipolar plate, according to an exemplary embodiment.

FIG. 2 shows an exemplary embodiment of a two-component bipolar plate 160, wherein bipolar plate 160 comprises a base 70 and a frame 80. Frame 80 may define a void 190 configured to house at least a flow structure 200 (not shown) and in some embodiments may house the MEA (not shown) and the flow structures (not shown) positioned on both sides of the MEA. Although the following description references bipolar plate 160, such disclosure may be equally applicable to bipolar plate 150.

Electrochemical cell 100, as shown in FIG. 1, may further comprise electrically-conductive gas diffusion layers (GDLs) (not shown) within electrochemical cell 100 on each side of MEA 140. In some embodiments, GDLs may serve as diffusion media enabling the transport of gases and liquids within the cell, provide electrical conduction between bipolar plates 150 and 160 and PEM 130, aid in the removal of heat and process water from the cell, and in some cases, provide mechanical support to PEM 140. In addition, in some embodiments, channels (not shown), known as flow fields, in bipolar plates 150 and 160 may be configured to supply gases to anode 110 and cathode 120 of MEA 140.

Reactant gases on each side of PEM 130 may flow through flow fields and diffuse through the porous GDLs. The flow fields and the GDLs may be positioned contiguously and coupled by the internal fluid streams. Accordingly, the flow field and the GDL may collectively define flow structure 200.

Frame 80 and base 70 may be generally planar and have a generally rectangular profile. In some embodiments, frame 80 and base 70 may have another shape, for example, a square, a "race-track" (i.e., a substantially rectangular shape with semi-elliptical later sides), circle, oval, elliptical, or other shape. The shape of frame 80 and base 70 may correspond to the other components of electrochemical cell 100 (e.g., cathode, anode, PEM, flow structure, etc.) or electrochemical cell stack.

Frame 80 and base 70 may be configured for coplanar coupling. Frame 80 and base 70 may be releasably coupled or fixedly coupled. One or more attachment mechanisms may be used including, for example, bonding material, welding, brazing, soldering, diffusion bonding, ultrasonic welding, laser welding, stamping, riveting, resistance welding, or sintering. In some embodiments, the bonding material may include an adhesive. Suitable adhesives include, for example, glues, epoxies, cyanoacrylates, thermoplastic sheets (including heat bonded thermoplastic sheets) urethanes, anaerobic, UV-cure, and other polymers. In some embodiments, frame 80 and base 70 may be coupled by a friction fit. For example, one or more seals between the components may produce adequate frictional force between the components when compressed to prevent unintended sliding.

In some embodiments, frame 80 and base 70 may be releasably coupled using fasteners, for example, screws, bolts, clips, or other similar mechanisms. In some embodiments, compression rods and nuts may pass through bipolar plates 150 and 160 or along the outside and be used to compress frame 80 and base 70 together as electrochemical cell 100 or a plurality of electrochemical cells 100 are compressed in a stack.

Coupled frame 80 and base 70 may form a plurality of different pressure zones and a plurality of seals may define one or more different pressure zones. The plurality of different seals and pressure zones, according to one embodiment are shown in FIG. 2. The plurality of seals may include a first seal 210, a second seal 220, and a third seal 230. First seal 210 may be contained entirely within second seal 220 and second seal 220 may be contained entirely within third seal 230. This arrangement of seals (i.e., one within the other) may be classified as a cascade seal configuration. The cascade seal configuration may provide several advantages. For example, the cascade seal configuration may limit the potential of high pressure hydrogen escaping electrochemical cell 100 by providing seal redundancy in the form of multiple layers of sealing protection. Reducing the potential of hydrogen leaks may benefit safety and energy efficiency. In addition, the cascade seal configuration may also allow for self-regulation of pressure by allowing the bleeding of high pressure from high pressure zones to lower pressure zones.

The shape of first seal 210, second seal 220, and third seal 230 may generally correspond to the shape of bipolar plates 150 or 160, as shown in FIG. 2. First seal 210, acting as a high pressure seal, may define a portion of a high pressure zone 240 and be configured to contain a first fluid 250 (e.g., hydrogen) within high pressure zone 240. First seal 210 may delimit the outer boundaries of high pressure zone 240 at least between frame 80 and base 70. High pressure zone 240 may include flow structure 200 extending through void 190 when frame 80 and base 70 are coupled. First fluid 250 may flow throughout high pressure zone 240 through flow structure 200 from cathode 130.

Hydrogen formed at cathode 130 may be collected in high pressure zone 240 and the connection between frame 80 and base 70 may be sealed by first seal 210. Hydrogen within high pressure zone 240 may be compressed and, as a result, may increase in pressure as more and more hydrogen is formed and collected in high pressure zone 240. Hydrogen in high pressure zone 240 may be compressed to a pressure greater than, for example, about 15,000 psi.

As shown in FIG. 2, first seal 210 may be configured to extend around the exterior of high pressure ports 260. High pressure ports 260 may be configured to supply or discharge first fluid 250 from high pressure zone 240. High pressure ports 260 may be in fluid communication with high pressure ports of adjacent electrochemical cells in a multi-cell electrochemical compressor.

Second seal 220 may define the outer circumference of intermediate pressure zone 270. Intermediate pressure zone 270 may be delimited by first seal 210, second seal 220, frame 80 and base 70. Intermediate pressure zone 270 may be configured to contain a second fluid 280. Intermediate pressure zone 270 may further comprise one or more intermediate pressure ports 290.

Intermediate pressure zone 270 may be configured to collect and direct second fluid 280 to intermediate pressure ports 290. As shown in FIG. 2, intermediate pressure zone 270 may extend around the circumference of high pressure zone 240 separated by first seal 210. The cross-sectional area and volume of intermediate pressure zone 270 may vary based on the geometry of frame 80, base 70, first seal 210, and second seal 220.

As shown in FIG. 2, intermediate pressure zone 270 may be in fluid communication with one or more intermediate pressure ports 290. Intermediate pressure ports 290 may be configured to discharge second fluid 280 contained within intermediate pressure zone 270. The shape and number of intermediate pressure ports 290 may vary. For example, intermediate pressure ports may be square, rectangle, triangle, polygon, circle, oval, or other shape. The number of intermediate pressure ports 290 may vary from 1 to 25 or more. As shown in FIG. 2, intermediate pressure ports 290 may be evenly distributed along the length of bipolar plate 160. In some embodiments, intermediate pressure ports 290 may extend the full circumference of intermediate pressure zone 270.

In some embodiments, second fluid 280 discharged via intermediate pressure ports 290 may be resupplied to electrochemical cell 100. In some embodiments, second fluid 280 discharged via intermediate pressure ports 290 may be collected and recycled. Second fluid 280 in intermediate pressure zone 270 may generally be lower pressure than first fluid 250 in high pressure zone 240.

Third seal 230 may define low pressure zone 300 and be configured to contain a third fluid 310 within low pressure zone 300. Low pressure zone 300 may be delimited by second seal 220, third seal 230, frame 80, and base 70. Low pressure zone 890 may be configured to contain a third fluid 310. Low pressure zone 300 may further comprise one or more low pressure ports 320.

Low pressure zone 300 may be configured to collect and direct third fluid 310 to low pressure ports 320. As shown in FIG. 2, low pressure zone 300 may extend around the circumference of intermediate pressure zone 270, separated by second seal 220. The cross-sectional area and volume of low pressure zone 300 may vary based on the geometry of frame 180, base 70, second seal 220 and third seal 230.

As shown in FIG. 2, low pressure zone 300 may be in fluid communication with one or more low pressure ports 320. Low pressure ports 320 may be configured to discharge third fluid 310 contained within low pressure zone 300. The shape of low pressure ports 320 may vary. For example, low pressure ports 320 may be square, rectangle, triangle, polygon, circle, oval, or other shape. The number of low pressure ports 320 may vary, for example, from 1 to 50 or more. As shown in FIG. 2, low pressure ports 320 may be spaced between second seal 220 and third seal 891 and evenly staggered along the length of bipolar plate 160. In some embodiments, low pressure ports 320 may extend the full circumference of low pressure zone 300.

Third fluid 310 discharged via low pressure ports 320 may be resupplied to electrochemical cell 100. In some embodiments, third fluid 310 discharged via low pressure ports 320 may be collected and recycled. Third fluid 310 in low pressure zone 300 may generally be lower pressure than first fluid 250 in high pressure zone 240 and second fluid 280 in intermediate pressure zone 270.

According to exemplary embodiments, first seal 210, second seal 220, and third seal 230 may be part of an assembly of sealing components capable of sealing different pressure zones (e.g., high pressure zone 240, intermediate pressure zone 270, and low pressure zone 300) of bipolar plate 160, and withstanding pressures in excess of 15,000 psig for long periods of time (e.g., greater than 10 years) and withstand many pressure cycles (e.g., greater than 7,000 cycles).

In some embodiments, bipolar plates 150 and 160 may be configured such that just two pressure zones are formed. For example, bipolar plates 150 and 160 may be configured such that just a first seal 210 and a third seal 230 form a high pressure zone 240 and a low pressure zone 300, thereby eliminating second seal 220 and intermediate pressure zone. In some embodiments, it is also contemplated that bipolar plates 150 and 160 may be configured such that more than three pressure zones are formed. For example, a fourth pressure zone may be formed.

Figure 3:
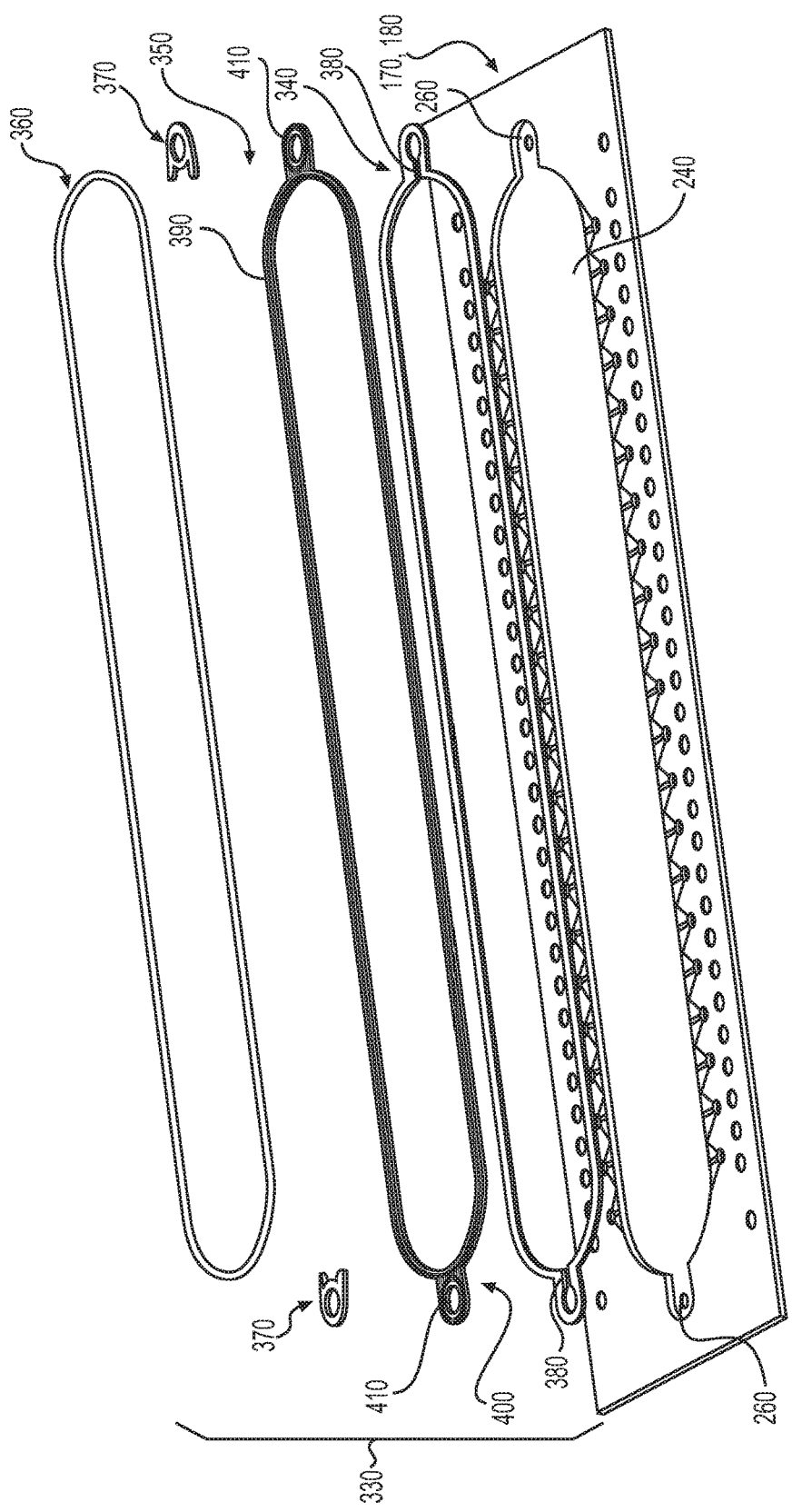
FIG. 3 is an exploded assembly view of a first seal assembly, a base, and a frame according to an exemplary embodiment.

According to an exemplary embodiment, first seal 210 may comprise a first seal assembly 330. FIG. 3 shows and exploded assembly view of first seal assembly 330 in alignment with another exemplary embodiment of a base 170 and a frame 180 positioned on top of base 170. First seal assembly 330 may comprise a first high pressure seal 340, an insert plate 350, a second high pressure seal 360, and two high pressure port seals 370. In some embodiments, high pressure port seals 370 may be formed as part of second high pressure seal 360, thereby constituting a single high pressure seal. First seal assembly 330 may be configured to such that it may be assembled into a single component and then may be installed in bipolar plate 150 as a drop-in insert to frame 180 and may rest on base 170. In some embodiments, the corresponding geometry of frame 180, high pressure zone 240 and seal assembly 330 may allow self-alignment of seal assembly 330 as it is may be inserted through frame 180 and placed on base 170.

According to an exemplary embodiment, first seal assembly 330 may be replaced by removing first seal assembly 330 through frame 180 without the need for separating base 170 and frame 180. This easy interchangeability of seal assembly 330 may allow for independent tuning of seal compression regardless of the total stack pre-load. In addition, this easy interchangeability may allow for more convenient optimization of performance and sealing capability by varying thicknesses, mechanical properties, and materials as described in more detail herein.

As shown in FIG. 3, first high pressure seal 340 may be a "race-track" shaped seal that may align with the outer perimeter of high pressure zone 240 and may extend around the exterior of high pressure ports 260. In other embodiments the shape of first high pressure seal 340 may vary, for example, to correspond with the shape of high pressure zone 240. First high pressure seal 340 may be configured to aid in containing first fluid 250 (e.g., hydrogen) within high pressure zone 240. First high pressure seal 340 may include cutouts at each end, which may align and correspond with high pressure ports 260. First high pressure seal 340 may also include one or more channels 380 that extend between the cutouts and high pressure zone 240 such that first fluid 250 may flow between high pressure ports 260 and high pressure zone 240.

Figure 6:
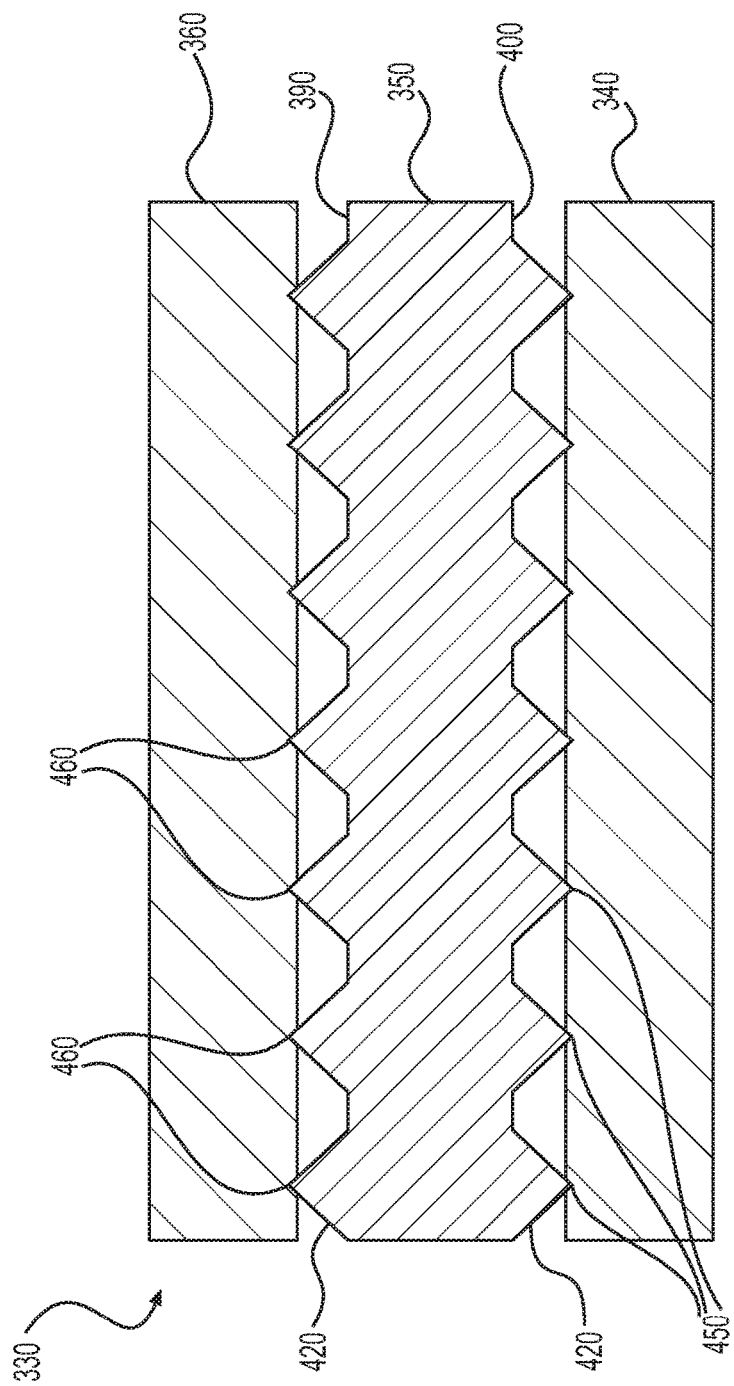
FIG. 6 is a cross-sectional view of a portion of a first seal assembly, according to an exemplary embodiment.

The dimensions of first high pressure seal 340 including the shape, thickness, and width may vary, and may be based on the dimensions of electrochemical cell 100 and bipolar plate 160. A cross-section of first high pressure seal 340 may have a variety of shapes. For example, a cross-section of first high pressure seal 340 may be a square, rectangle, circle, oval, or other like shape. In some embodiments as shown in FIG. 6, first high pressure seal 340 may have a substantially rectilinear cross-section. Like the cross-section of first high pressure seal 340 the thickness may also vary depending on, for example, the size of electrochemical cell 100, the geometry of bipolar plates 150 and 160, the operating pressure of electrochemical cell 100, the material of first high pressure seal 340. The thickness of first high pressure seal 340 may range between, for example, about 0.1 mm to about 1.0 mm.

Second high pressure seal 360, which may be positioned on the opposite side of insert plate 350 of first high pressure seal 340, may correspond to the shape of first high pressure seal 340 and like first high pressure seal 340 may align with the outer perimeter of high pressure zone 240. In some embodiments however, unlike first high pressure seal 340, second high pressure seal 360 may be configured such that it does not extend around high pressure ports 260, as shown in FIG. 3. Instead, in these embodiments, separate high pressure port seals 370 may be configured to extend around high pressure ports 260 and be installed adjacent second high pressure seal 360.

As shown in FIG. 3, insert plate 350 may include an upper surface 390 and a lower surface 400. Insert plate 350 may be disposed between first high pressure seal 340 and second high pressure seal 360 and high pressure port seals 370. The profile of insert plate 350 may correspond to first high pressure seal 340 and high pressure zone 240, such that insert plate 350 extends around the perimeter of high pressure zone 240 and high pressure ports 260. Insert plate 350 may include one or more high pressure passages 410. For example, high pressure passages 410 may be positioned at each end of insert plate 350 corresponding in positioning to high pressure ports 260 thereby allowing fluid (e.g., first fluid 250) to flow through high pressure ports 260 and through insert plate 350. For example, first fluid 250 may flow through high pressure ports 260 and insert plate 350 to and from adjacent electrochemical cells 100.

Figure 4:
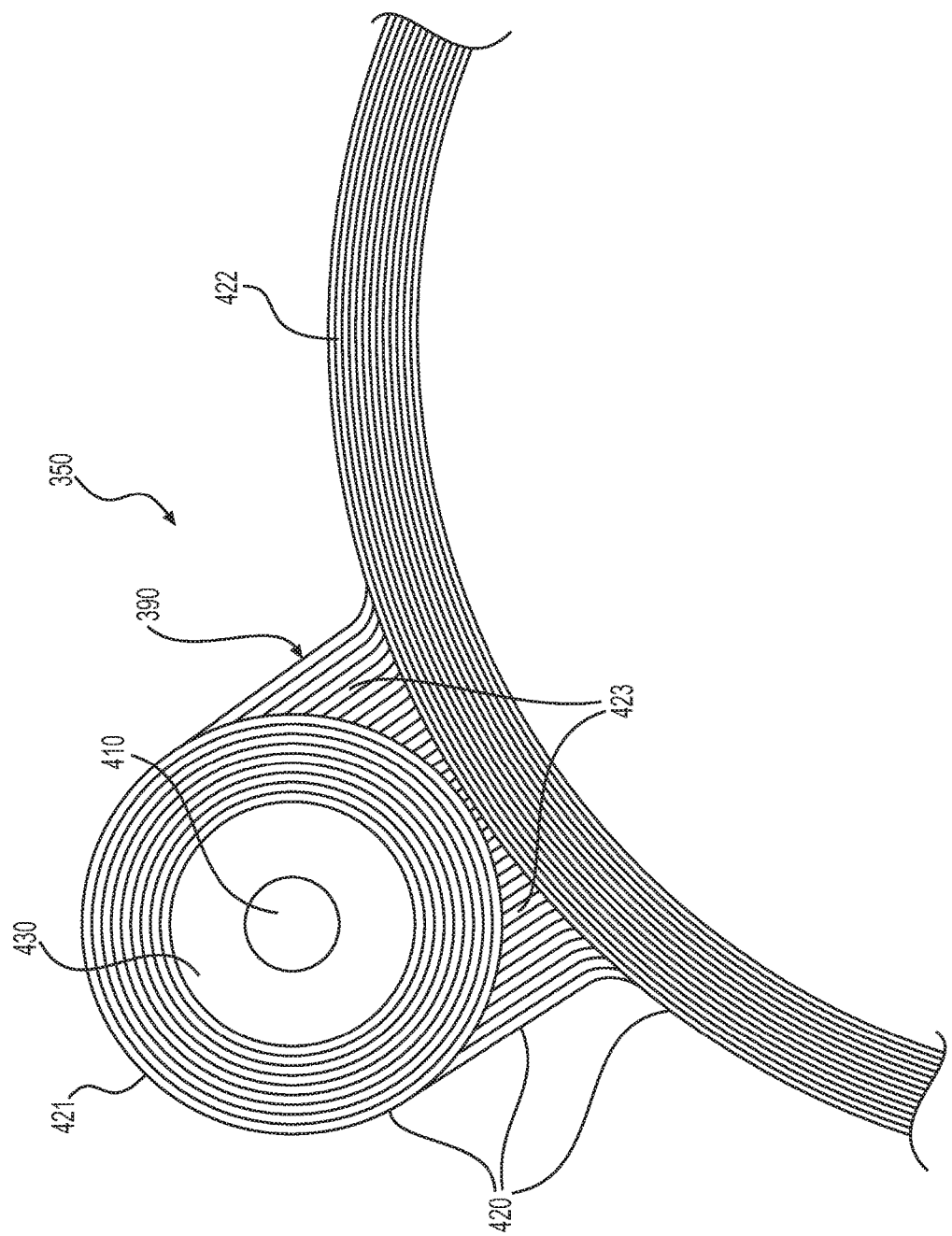
FIG. 4 is a close up view of an upper surface of an insert plate, according to an exemplary embodiment.

FIG. 4 is a close up view of one end of insert plate 350 facing upper surface 390. Although only one end of insert plate 350 is show, the other end may be identical. As shown in FIG. 4, insert plate 350 may have a plurality of ridges 420 formed on (e.g., etched into) upper surface 390. The orientation and direction of the plurality of ridges 420 may vary depending on the section of upper surface 390. For example, as shown in FIG. 4, a first plurality of ridges 421 may encircle high pressure passage 410. The first plurality of ridges 421 may be set back a distance from high pressure passage 410 creating a recess ring 430 around high pressure passage 410. A second plurality of ridges 422 may extend around the perimeter of insert plate 350. For example, as shown in FIG. 4, the second plurality of ridges 422 may cover from the inner edge to the outer edge of upper surface 390, thereby covering a majority of upper surface 390.

A third plurality of ridges 423 may extend between the first plurality of ridges 421 and the second plurality ridges 422. The third plurality of ridges 423 may be configured to produce uniform compression over all areas of second high pressure seal 360 and high pressure port seals 370. Therefore, in some embodiments, the first plurality of ridges 421, the second plurality of ridges 422, and third plurality of ridges 423 may generally cover the entire upper surface of insert plate 350 besides recessed ring 430. The lack of ridges in recessed ring 430 may allow flow of first fluid 250 in that area. Recessed ring 430 may align with the cutout portion of the high pressure seals, as shown in FIG. 3.

Figure 5:
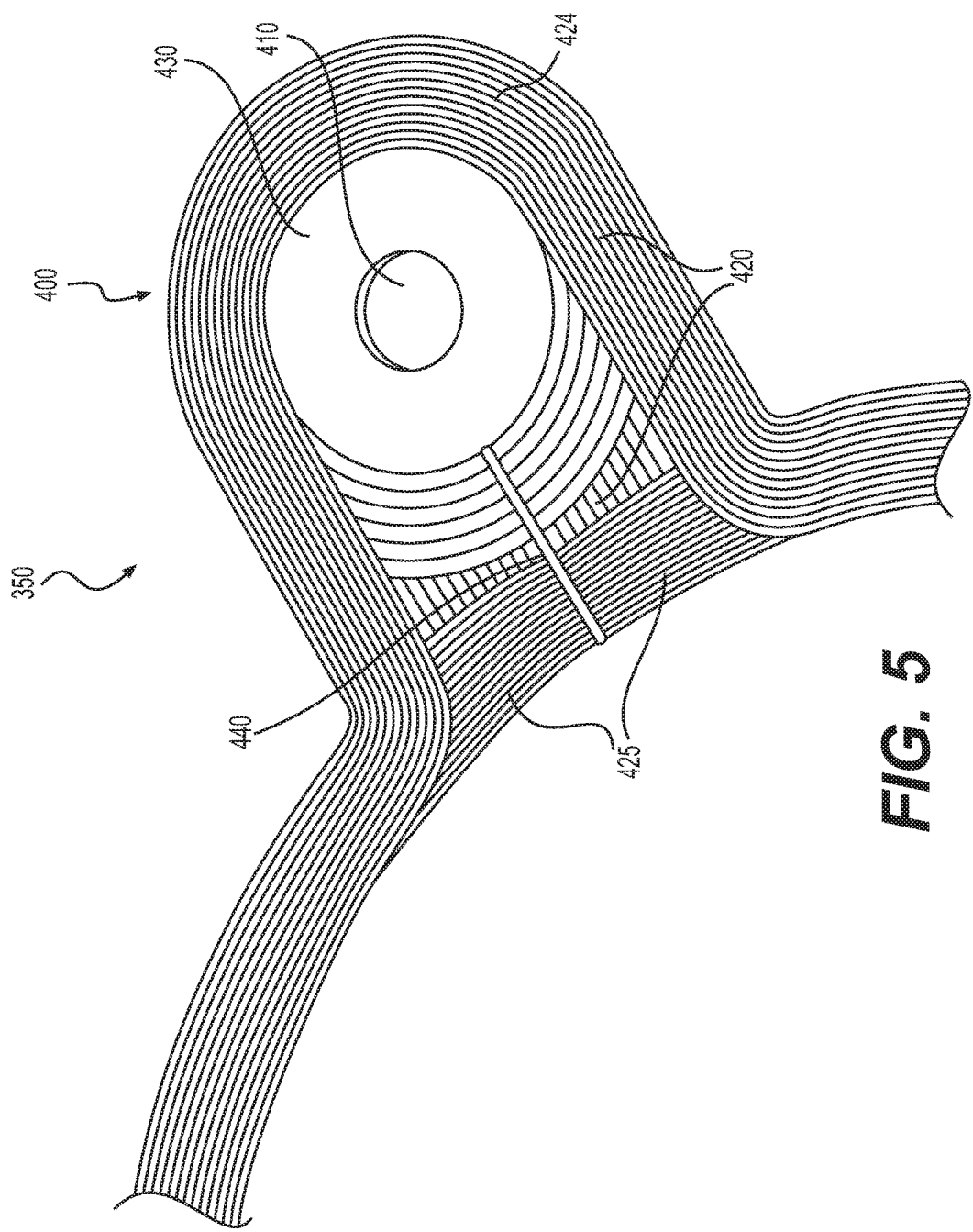
FIG. 5 is a close up view of a lower surface of an insert plate, according to an exemplary embodiment.

FIG. 5 is a close up view of one end of insert plate 350 facing the lower surface 400. Although only one end of insert plate 350 is show, the other end may be identical. As shown in FIG. 5, insert plate 350 may have a plurality of ridges 420 formed on (e.g., etched into) lower surface 400. The orientation and direction of the plurality of ridges may vary depending on the section of lower surface 400. For example, as shown in FIG. 5, a fourth plurality of ridges 424 may extend around the entire perimeter of insert plate 350 including around high pressure passages 410. A fifth plurality of ridges 425 may extend between the fourth plurality of ridges thereby generally covering the majority of lower surface 400 of insert plate 350 besides recessed ring 430. The fifth plurality of ridges 425 may be configured to produce uniform compression over all areas of first high pressure seal 350. As shown in FIG. 5, recessed ring 430 on lower surface 400 may be free of ridges thereby enabling flow of first fluid 250 in this area. Recessed ring 430 of lower surface 400 may align and correspond to the cutout portion of first high pressure seal 340, as shown in FIG. 3.

As shown in FIG. 5, the fifth plurality of ridges 425 may have a channel 440 extending from recessed ring 430 to the internal cavity of insert plate 350. Channel 440 may align and correspond to the cutout channel 380 of first high pressure seal 340. Channel 440 and the cutout channel may be configured to allow flow between high pressure zone 240 and high pressure passages 410 and high pressure ports 260.

First seal assembly 330 may be configured such that first high pressure seal 340 may be pressed onto the lower surface 400 of insert plate 350 and second high pressure seal 360 and high pressure port seals 370 may be pressed onto upper surface 390 of insert plate 350, thereby forming a single component constituting first seal assembly 330.

FIG. 6 shows a cross-sectional of a portion of first seal assembly 330, according to an exemplary embodiment, where first high pressure seal 340 is pressed on to lower surface 400 of insert plate 350 and second high pressure seal 360 is pressed onto the upper surface 390 of insert plate 350. Although high pressure port seals 370 are not shown in FIG. 6, the description herein regarding second high pressure seal 360 may be equally applicable to high pressure port seals 370.

First high pressure seal 340 and second high pressure seal 360 may be configured such that, under compression (e.g., via pressing), first high pressure seal 340 and second high pressure seal 360 primarily undergoes plastic deformation. In particular, first high pressure seal 340 and second high pressure seal 360 may be made from a "hard" material with a high creep modulus and compressive yield strength. For example, first high pressure seal 340 and second high pressure seal 360 may be made from a material having a compressive yield strength of 10,000 to 20,000 psi and having a creep modulus in a range sufficient to withstand pressure great than 15,000 psi.

The plurality of ridges 420 extending from lower surface 400 and upper surface 390 of insert plate 350 may be configured to apply sufficient pressure to plastically deform first high pressure seal 340 and second high pressure seal 360 and thereby forming sealing surfaces. For example, as shown in FIG. 6, when first high pressure seal 340 may be pressed onto lower surface 400 of insert plate 350, the plurality of ridges 420 (e.g., fourth plurality of ridges 424) extending from lower surface 400 may apply sufficient pressure to plastically deform first high pressure seal 340 and form a first sealing surface 450. Similarly, when second high pressure seal 360 may be pressed onto upper surface 390 of insert plate 350, the plurality of ridges 420 (e.g., second plurality of ridges 422) extending from upper surface 390 may apply sufficient pressure to plastically deform second high pressure seal 360 and form a second sealing surface 460. For example, compressive pressure of about 25,000 psi may be sufficient to create a seal capable of sealing about 12,000 psi. Additional sealing surfaces may be formed to define high pressure zone 240, for example, a sealing surface may be formed between the upper surface of second high pressure seal 360 and MEA 140 when electrochemical cell 100 is assembly and a sealing surface may be formed between the lower surface of first high pressure seal 340 and base plate 170 when first seal assembly 330 is positioned on base plate 170.

The plurality of ridges 420 may have any geometry, sufficient to deform first high pressure seal 340, second high pressure seal 360, and high pressure port seals 370. For example, the plurality of ridges may have a triangular configuration 471 (FIG. 7A), a cusp configuration 472 (FIG. 7B), or a flat blade configuration 473 (FIG. 7C). In some embodiments, the plurality of ridges may have a flat top configuration. The flat top configuration may be, for example, square shape, rectangular, or conical. It is contemplated that the configuration of each plurality or ridges may be different than the configuration of the other plurality of ridges, or the same for all the protrusions. Although the height of each set of ridges in FIGS. 7A-7C is substantially the same it is contemplated that in some embodiments the height of the plurality of ridges may vary. For example, every other ridge may have the same height, the outer most ridges may be taller and at the same height, the one or more inner ridges may be taller, the ridges may descend or ascend in height moving the interior to the exterior, or every ridge may be at a different height. Embodiments having ridges of different heights may be configured to better account for variability in machining tolerances of the other components. The plurality of ridges 420 may be manufactured by photo etching or electrochemical machining of insert plate 350.

In an exemplary embodiment, first sealing surface 450 and second sealing surface 460 may be a knife edge sealing surface having a plurality of ridges 420 etched to a knife edge (e.g., triangular configuration of FIG. 7A). During assembly, the plurality of ridges 420 may be compressed against first high pressure seal 340, second high pressure seal 360, and high pressure port seals 370 causing the knife edge of each ridge to press into and seal with the corresponding seal. As further compressive forces are applied to first seal assembly 330, sufficient stresses may be formed to cause first high pressure seal 340, second high pressure seal 360, and high pressure port seals 370 to plastically deform and create first sealing surface 450 and second sealing surface 460. The plurality of ridges 420 may function as stress concentrators and when pressed into the corresponding seal (e.g., first high pressure seal 340, second high pressure seal 360, high pressure port seals 370) may create localized stress in the material higher than a target sealing pressure. The plurality of ridges 420 may be arranged such that they apply relatively uniform compression pressure to first high pressure seal 340, second high pressure seal 360, and high pressure port seals 370.

It may be advantageous to control the amount of penetration of the plurality of ridge 420 into the corresponding seal in order to avoid the plurality of ridges 420 cutting through the seal and/or control the seal compression. One way of controlling the penetration of the plurality of ridges and seal compression may be to incorporate an adhesive into first seal assembly 330. For example, the adhesive may be added to the top or bottom surface of frame 180. The adhesive may be configured to undergo some deformation (e.g., compression) due to the compressive force applied, but the adhesive may be configured such that the designed depth of compression corresponds to the desired penetration depth and/or seal compression of the plurality of ridges 420.

Another way of controlling the penetration of the plurality of ridges 420 may be to have at least one ridge that extends beyond the other plurality of ridges 420 on the same surface. The taller ridge may be configured to function as a "hard stop" by contacting the surface of the opposite component (e.g., base 170) at which point further movement of insert plate 350 through first high pressure seal 340 may be prevented and thereby further penetration of the other plurality of ridges 420 into first high pressure seal 340 may be controlled.

FIG. 8 illustrates a plurality of ridges 420 as may be formed in insert plate 350, according to an exemplary embodiment. As shown in FIG. 8, each ridge may be a certain height H, spaced a certain distance D from one another, and the sloped sides of each ridge may form an angle α. According to various embodiments, the height of the ridges may vary, for example, from about 0.002 inches to about 0.010 inches, about 0.006 inches to about 0.008 inches, about 0.005 inches to about 0.008 inches, about 0.001 inches to about 0.010 inches, or about 0.001 inches to greater than 0.010 inches. According to various embodiments, the distance between ridges may vary, for example, from about 0.022 inches to about 0.028 inches, about 0.020 inches to about 0.030 inches, or about 0.01 inches to about 0.05 inches, or about 0.01 inches to greater than 0.05 inches. According to various embodiment, angle α may vary, for example, from about 85 degrees to about 95 degrees, about 75 degrees to about 105 degrees, about 65 degrees to about 115 degrees, about 55 degrees to about 125 degrees, or less than about 55 degrees to about 125 degrees.

The design of first seal assembly 330 as described herein may enable a wide selection of materials to be used for first high pressure seal 340, second high pressure seal 360, high pressure port seals 370, and insert plate 350. For example, in some embodiments, first high pressure seal 340, second high pressure seal 360, and high pressure port seals 370 may be made of the same material while in some embodiments they may be made of different materials.

In some embodiments, first high pressure seal 340 and second high pressure seal 360 may be made of a polymeric sealing material including, but not limited to, Torlon®, polyether ether ketone (PEEK), polyethyleneimine (PEI), polyethylene terephthalate (PET), polycarbonate, polyimide, and polysulfone. [PLEASE PROVIDE APPROPRIATE LIST]. The polymer materials may be acid resistant and should not leach materials that are harmful to the operation of electrochemical cell 100. In some embodiments, first high pressure seal 340 and second high pressure seal 360 may be made from metal material including, but not limited to, tin, tin alloys, stainless steel, silver, platinum, and gold. In such embodiments, the metals may be corrosion resistant or have a corrosion resistant coating. In some embodiments, first high pressure seal 340 and second high pressure seal 360 may be made of a composite of polymeric and/or metallic materials. In some embodiments, a lower surface of first high pressure seal 340 that contacts base 170 may include a laminate material. The material properties of the laminate material may be different than the material properties of first high pressure seal 340. For example, the laminate material may be softer than the first high pressure seal 340 such that a soft seal is formed between base 170 and the lower surface of first high pressure seal 340. In some embodiments, the lower surface of first high pressure seal 340 may be coated with an adhesive configured to aid in sealing to the surface of base 170. The adhesive may be, for example, a pressure or heat activated adhesive.

Similarly to the seals, the use of seal assembly 330 for first seal 210 may allow for a wide selection of materials to be used for frame 180, base 170, as well as insert plate 350. In some embodiments, frame 180, base 170, and insert plate 350 may be formed of the same materials or different materials. Frame 180, base 170, and insert plate 350 may be formed of a metal, such as, stainless steel, titanium, aluminum, nickel, iron, etc., or a metal alloy, such as, nickel chrome alloy, nickel-tin alloy, Inconel, Monel, Hastelloy, or a combination there of. In some embodiment, frame 180 may also be formed of polymers, composites, ceramics, or any material capable of handling the compression force applied to the cell upon assembly. For example, in some embodiments frame 180 may be formed of Polyetherimide (PEI), polyethylene naphthalate (PEN) polysulfone (PSU), or polyphenylsulfone (PPSU).

In some embodiments, frame 180 and base 170 may comprise a clad material, for example, aluminum clad with stainless steel on one or more regions. Cladding may provide the advantages of both metals, for example, in the case of a bipolar plate fabricated from stainless steel-clad aluminum, the stainless steel protects the aluminum core from corrosion during cell operation, while providing the superior material properties of aluminum, such as, high strength-to-weight ratio, high thermal and electrical conductivity, etc. In some embodiments, frame 180 may comprise anodized, sealed, and primed aluminum. In some embodiments, frame 180 may comprise chromated and spray coated aluminum.

In some embodiments, frame 180 may be formed of a composite, such as, carbon fiber, graphite, glass-reinforce polymer, thermoplastic composites. In some embodiments, frame 180 may be formed of a metal which is coated to prevent both corrosion and electrical conduction. According to various embodiments, frame 180 may be generally non-conductive reducing the likelihood of shorting between the electrochemical cells. Base 170 may be formed of one or more materials that provide electrical conductivity as well as corrosion resistance during cell operation. For example, base 170 may be configured to be electrically conductive in the region where the active cell components sit (e.g., flow structure, MEA, etc.).

Factors and properties to be considered in selecting the material and geometry for a component (e.g., first high pressure seal 340, insert plate 350, second high pressure seal 360, high pressure port seals 370, frame 180, base 170) may include at least the compressive load requirements, material compatibility, sealing pressure, cost of material, cost of manufacturing, and ease of manufacturing. The variety of materials made suitable by utilizing seal assembly 330 described herein may allow for the selection of less expensive materials and less costly manufacturing. For example, lower cost commodity plastics, some of which have been listed herein, may be used for the high pressure seals. In addition, earlier multi-component bipolar plates could be expensive to manufacture due to the intricate details on the plates requiring the use of expensive conventional milling. Utilizing the seal assembly 330 as described herein may de-feature bipolar plates, for example, base 170 and frame 180 may be manufactured without the need for any conventional milling, which drives up manufacturing cost.

The use of seal assembly 330 to seal around high pressure ports 260 may also eliminate the need for elastomers (e.g., o-rings) traditionally used for seal these ports. Elastomers are often a reliability issue in high pressure system and therefore removal of elastomers may make the electrochemical cell more robust and tolerant.

It is understood that the features described herein may be used to seal other components of the electrochemical cell and/or may be used in cells that do not employ the cascade seal configuration.

The cascade seal configuration as described above may be utilized in both bipolar plate 150 and 160 of electrochemical cell 100, as described above. In some embodiments, the cascade seal configuration may be utilized in just one bipolar plate 150 or 160.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A bipolar plate assembly, comprising:
   a first seal assembly including a first high pressure seal, a second high pressure seal, and an insert plate disposed between the first high pressure seal and the second high pressure seal;
   the insert plate has a plurality of ridges formed on an upper surface and a lower surface of the insert plate configured to penetrate into the first high pressure seal and the second high pressure seal when the first high pressure seal and the second high pressure seal are pressed onto the insert plate, thereby forming the seal assembly; and
   a frame and a base configured to be joined to form a bipolar plate and define a high pressure zone;
   wherein the seal assembly when installed in the bipolar plate is configured to seal the portion of the high pressure zone defined by the bipolar plate.

2. The bipolar plate assembly of claim 1, wherein the frame defines a void configured to contain the seal assembly.

3. The bipolar plate assembly of claim 1, wherein the seal assembly further includes two high pressure port seals that are configured to be pressed onto the upper surface of the insert plate at opposite ends.

4. The bipolar plate assembly of claim 1, wherein the plurality of ridges are formed by photo etching of the insert plate.

5. The bipolar plate assembly of claim 1, wherein the seal assembly may be replaced by removing the seal assembly through the frame.

6. The bipolar plate assembly of claim 1, further comprising a second seal and a third seal that are arranged in a cascade seal configuration between the frame and the base.

7. The bipolar plate assembly of claim 1, wherein the seal assembly may be installed and removed without separating the frame and the base.

8. The bipolar plate assembly of claim 1, wherein when the first high pressure seal and the second high pressure seal are pressed onto the insert plate, the plurality of ridges are configured to cause plastic deformation of the first high pressure seal and second high pressure seal creating a first sealing surface between the insert plate and the first high pressure seal and a second sealing surface between the insert plate and the second high pressure seal.

9. The bipolar plate assembly of claim 1, wherein the seal assembly is configured to seal the high pressure zone for pressures of at least 15,000 psi.

10. The bipolar plate assembly of claim 1, where the plurality of ridges are at least one of knife edge shaped ridges, cusp shaped ridges, or flat blade shaped ridges.

11. A method of assembling a multi-component bipolar plate, the method comprising:
    pressing a first high pressure seal onto a lower surface of an insert plate, wherein the lower surface has a first plurality of ridges configured to penetrate the first high pressure seal thereby creating a first sealing surface;
    pressing a second high pressure seal onto an upper surface of the insert plate, wherein the upper surface has a second plurality of ridges configured to penetrate the second high pressure seal thereby creating a second sealing surface;
    wherein pressing the first high pressure seal onto the lower surface of the insert plate and pressing the second high pressure seal onto the upper surface of the insert plate forms a first seal assembly; and
    installing the seal assembly into a frame and a base of the bipolar plate, thereby sealing a high pressure zone of the bipolar plate.

12. The method of claim 11, wherein pressing the first high pressure seal onto the lower surface of the insert plate causes the first high pressure seal to plastically deform thereby creating the first sealing surface.

13. The method of claim 11, wherein pressing the second high pressure seal onto the upper surface of the insert plate causes the second high pressure seal to plastically deform thereby creating the second sealing surface.

14. The method of claim 11, wherein installing the seal assembly includes inserting the seal assembly through the frame and placing the seal assembly on the base.

15. The method of claim 11, further including pressing two high pressure port seals onto the upper surface of the insert plate at opposite ends.

16. The method of claim 11, wherein the seal assembly is configured to be removed from the bipolar plate by removing the seal assembly through the frame.

17. The method of claim 11, further comprising installing a second seal and a third seal between the frame and base, such that the first seal assembly, the second seal, and the third seal are arranged in a cascade seal configuration.

18. The method of claim 11, wherein the high pressure zone is configured to handle pressures of at least 15,000 psi.

19. The method of claim 11, wherein the seal assembly is configured to self-align with the frame and the base.

20. An electrochemical cell comprising:
- a pair of bipolar plates and a membrane electrode assembly located between the pair of bipolar plates;
- wherein at least one of the bipolar plates comprises:
  - a first seal assembly including a first high pressure seal, a second high pressure seal, and an insert plate disposed between the first high pressure seal and the second high pressure seal;
  - the insert plate has a plurality of ridges formed on an upper surface and a lower surface of the insert plate configured to penetrate into the first high pressure seal and the second high pressure seal when the first high pressure seal and the second high pressure seal are pressed onto the insert plate, thereby forming the seal assembly; and
  - a frame and a base configured to be aligned to form the bipolar plate and define a high pressure zone;
  - wherein the seal assembly when installed in the frame and the base is configured to seal the high pressure zone of the bipolar plate.

* * * * *